United States Patent [19]
McKay et al.

[11] 4,214,244
[45] Jul. 22, 1980

[54] NULL PATTERN TECHNIQUE FOR REDUCTION OF AN UNDESIRABLE INTERFERING SIGNAL

[75] Inventors: Michael W. McKay, Maitland; Evan L. McDirmit, Orlando, both of Fla.

[73] Assignee: Martin Marietta Corporation, Orlando, Fla.

[21] Appl. No.: 210,270

[22] Filed: Dec. 20, 1971

[51] Int. Cl.² .............................................. G01S 7/36
[52] U.S. Cl. ............................ 343/18 E; 343/100 SA
[58] Field of Search .......... 343/100 R, 100 SA, 18 E, 343/100 CS, 117; 325/371

[56] References Cited
U.S. PATENT DOCUMENTS
3,124,801  3/1964  Callahan, Jr. .......... 343/100 SA UX Primary Examiner—Maynard R. Wilbur
Assistant Examiner—Richard E. Berger
Attorney, Agent, or Firm—Julian C. Renfro; Gay Chin; James B. Eisel

[57] ABSTRACT

A null pattern technique for reducing the effect of an undesired interfering signal in a data link channel, using an accepted monopulse tracking arrangement in a novel mode, such that the source of such interfering signal can be caused to be placed at the null of the antenna pattern used, thus greatly increasing the desired-signal-to-interfering-signal ratio without necessitating a physically large antenna.

22 Claims, 4 Drawing Figures

NULL PATTERN TECHNIQUE FOR REDUCTION OF AN UNDESIRABLE INTERFERING SIGNAL

BACKGROUND OF THE INVENTION

This invention relates to a null pattern technique for greatly reducing the effects of an undesirable cofrequency interfering signal in a data link channel.

It is of course well known in the art to utilize television data links that make it possible for a pilot of a launching aircraft to see the target through the weapon from a remote location, thus enabling the pilot to update the aimpoint in a most effective manner.

For weapon guidance purposes, it is desired to use a wide field of view antenna pattern which, by its nature, makes a considerable amount of angular discrimination very difficult to achieve. It is always possible that a target located jammer will be utilized, such as if a maritime target is involved, which means that a wide beamwidth antenna under such conditions is highly undesirable. Utilization of a narrow beam antenna, if possible, would give some degree of help to the discrimination situation, but it is of course well known that a narrow beam antenna is required to be of a large physical size to provide sufficient angular discrimination of the jammer when tracking and receiving information from the weapon or other vehicle enroute to a destination.

SUMMARY OF THE INVENTION

In accordance with this invention we have provided a more or less conventional antenna with an interference reduction mode of operation, with the result that a missile or other vehicle can be controlled to a much shorter range from a target or destination than otherwise would be possible. This is to say, in many instances a final aimpoint correction can be made when the missile or other vehicle is but a few thousand feet from the destination, due to a discrimination capability equivalent to that of a narrow beam antenna of considerable size.

In the typical instance in accordance with this invention, the antenna or antenna array is associated with both a single lobe sum pattern and a double lobe difference pattern, with the outputs of the antenna or antenna array being coupled to a hybrid such that sum and difference inputs are established. These sum and difference input signals are amplified and coupled to an angle detector circuit, with an output from the latter device being connected to a null positioning servo or an electronic scanning means, which serves in a well known way to direct the antenna means such that the angle error signal from the angle detector circuit is minimized.

In the absence of interfering signals, the desired output signal from the sum pattern is coupled to the data channel from a sum amplifier, through an appropriate switch means. Thus, in a conventional manner, error signals received by the angle detector bring about a repositioning of the antenna means, such that it aims at the missile TV transmitter.

Upon the reception of an interfering signal, detected either by the pilot or appropriate automatic circuitry, the difference output is utilized in the directing of the antenna means, in such a manner that the null portion of the difference pattern is directed toward the interfering source, thereby causing the interference signal to be vastly less effective than before.

That this may be accomplished, we arrange for the signal from the missile or other vehicle being controlled to be continuously interrupted, either on a regularly recurring or a random basis, and we further arrange the output from the angle detector circuit to be sampled at certain times. In the presence of no interfering signal, the aforementioned switch means in the output to the data channel is in its normal position such that the periodically interrupted desired signal is coupled in a more or less usual manner from the sum amplifier to the data channel, which signal may for example be viewed on an appropriate display in the cockpit of a launching aircraft.

Upon the reception of an interfering signal, however, the switch means is operated so as to cause the output of the difference IF amplifier to be directed to the data channel, which causes a change in the timing of the sample timing signal to a sample and hold device, causing the gating of error signals through latter device to occur at a time when the signal transmission from the missile being controlled is turned off. As a result, the angle bearing measurement to the interfering signal source can be made during the time that the desired signal is being interrupted, thus causing the antenna pattern positioning means to be operative to direct the difference pattern toward the interfering signal. Since a two lobe difference pattern is utilized, directing the null of the difference pattern toward the interfering signal advantageously causes latter signal to be received on a very low gain portion of the difference antenna pattern. In contrast, the desired source is necessarily received at a much higher level.

Accordingly, it is a primary object of the present invention to use angle measuring techniques for directing an antenna pattern null toward an interfering signal source, thus causing the signal-to-interfering-signal ratio to be significantly enhanced.

It is another object of this invention to provide significant discrimination against an unwanted signal within the field of view of a conventional antenna array, thus providing a discrimination equivalent to that of a much larger antenna.

It is another object of this invention to provide a null pattern technique that can be utilized for a wide range of purposes, not only for vehicle guidance, but also for citizens band radio and the like, thus making it possible for a receiving array to be rotated for minimum interference.

It is yet another object of this invention to provide a null pattern technique for reducing the effect of an undesired interfering signal in a data link channel, by utilizing an accepted monopulse tracking arrangement in a novel mode.

These and other objects, features and advantages of this invention will be more apparent from a study of the enclosed drawings in which.

Figure 3:
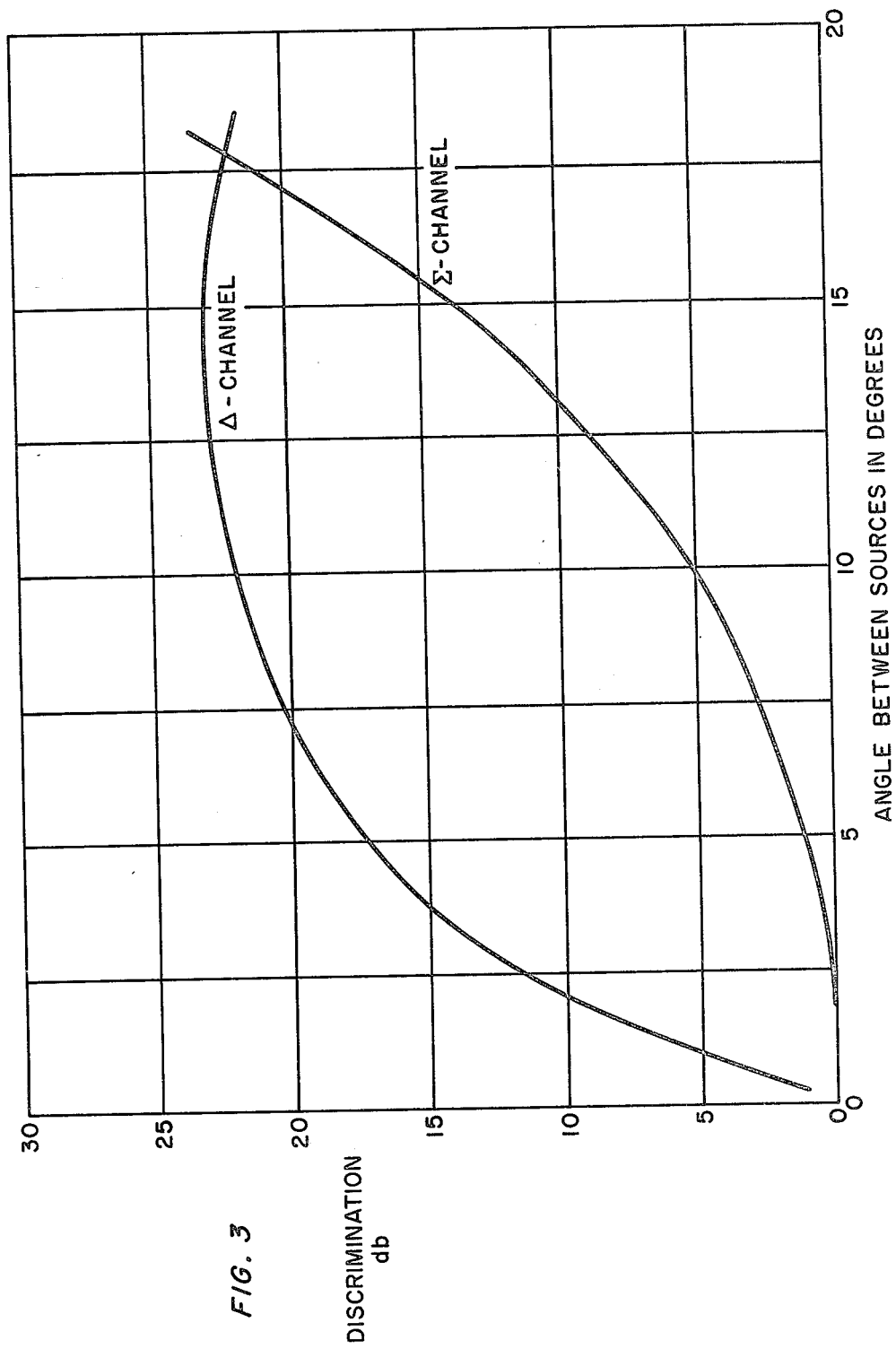
Figure 4:
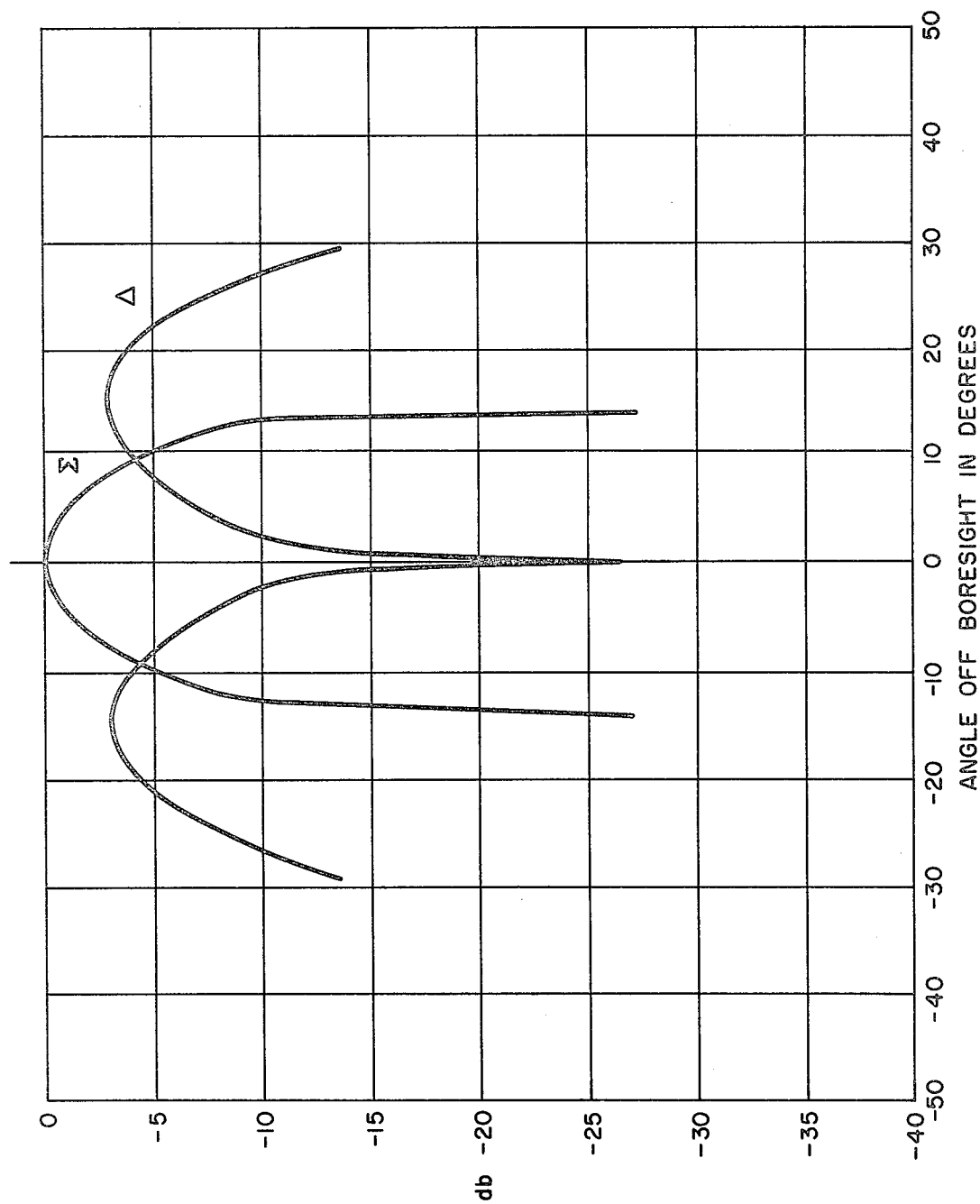

FIG. 3 shows a plot of angle between sources versus discrimination in decibels, with this figure of course revealing the large increase in discrimination when utilizing the output of the difference channel in accordance with our invention; and FIG. 4 is a plot of typical antenna patterns, with the sum pattern involving a single lobe and the difference pattern involving a pair of lobes, with a distinct null at the midpoint of such pair of lobes.

DETAILED DESCRIPTION

Figure 1:
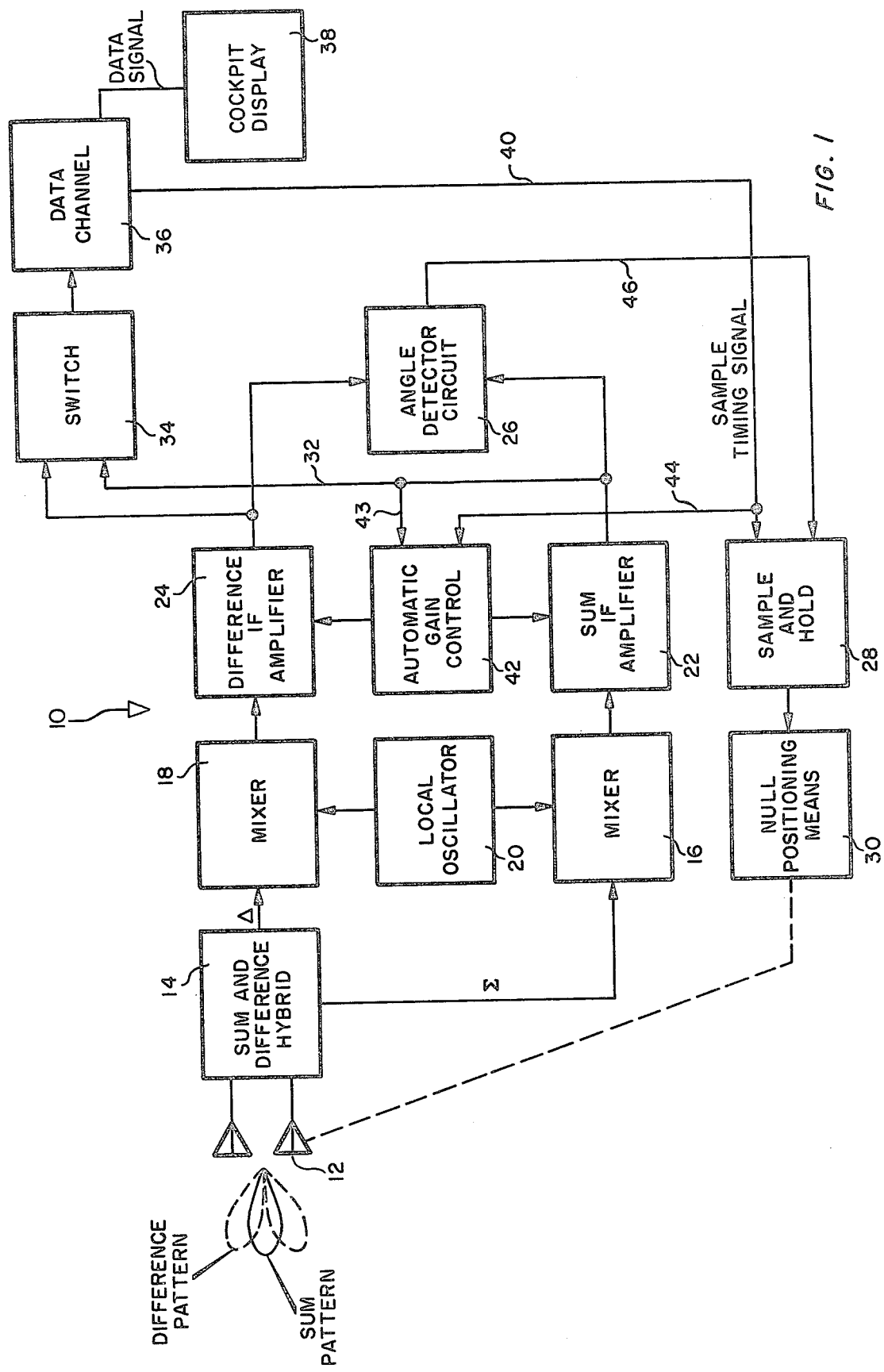
FIG. 1 is a block diagram showing an exemplary version of our invention as utilized in a single plane.

Turning now to FIG. 1, we have shown a single plane embodiment of a monopulse receiving system 10 illustrative of our invention, although as will be explained, our invention may be utilized for angle tracking in two orthogonal planes. The illustrated system utilizes an antenna means 12, which may for example be a gyro stabilized flat plate monopulse antenna gimbaled in both yaw and pitch planes, but we are not to be so limited, for the antennas usable in accordance with our invention may include parabolic, log periodic, dipole, or any other suitable type. The antenna means, which may or may not be an array, enables a Sum Pattern and a Difference Pattern to be formed, as will be noted from the solid line, and the dashed line sketches on this figure, respectively. Also see FIG. 4. The sum pattern is normally used for receiving the data signal in the absence of interference.

The output signals from the antenna means 12 are combined in a Sum and Difference Hybrid 14, with this latter device forming a sum pattern $\Sigma$ as one output signal and a difference pattern $\Delta$ as the second output signal. The sum output is directed to a sum mixer 16, whereas the difference output is directed to a mixer 18. By heterodyning with a local oscillator 20, the mixers 16 and 18 generate output signals at different frequencies, of which typically the lower frequency is selectively amplified by Sum IF amplifier 22 and difference IF amplifier 24. However, we are not to be so limited.

If a missile or other vehicle is being guided to a destination such as a target, we arrange for the signal from the signal source on the missile to be continuously interrupted. If the missile utilizes a TV camera in its nose for observation of the target scene, there can, for example, be a regularly recurring output from the missile transmitter, with the cessation of the signal taking place at instances related to the picture vertical retrace period. Note FIG. 2, wherein on Line A the output from the missile transmitter is depicted, with the cessations of such output signal therefore being on a regularly recurring basis. For example, a 60 cycle per second rate may be employed, although higher rates, or even a random interruption arrangement may be used if desired.

The outputs from the amplifiers 22 and 24 of the signal processing means shown in FIG. 1 are coupled to suitable detector means, such as an Angle Detector Circuit 26, latter device serving to develop an angle pointing error signal. More particularly, the Angle Detector Circuit 26 serves to provide a voltage level proportional to the difference in antenna boresight direction and the line of sight angle to a signal source, be such source the desired, periodically interrupted signal, or an interfering or jammer signal.

Figure 2:
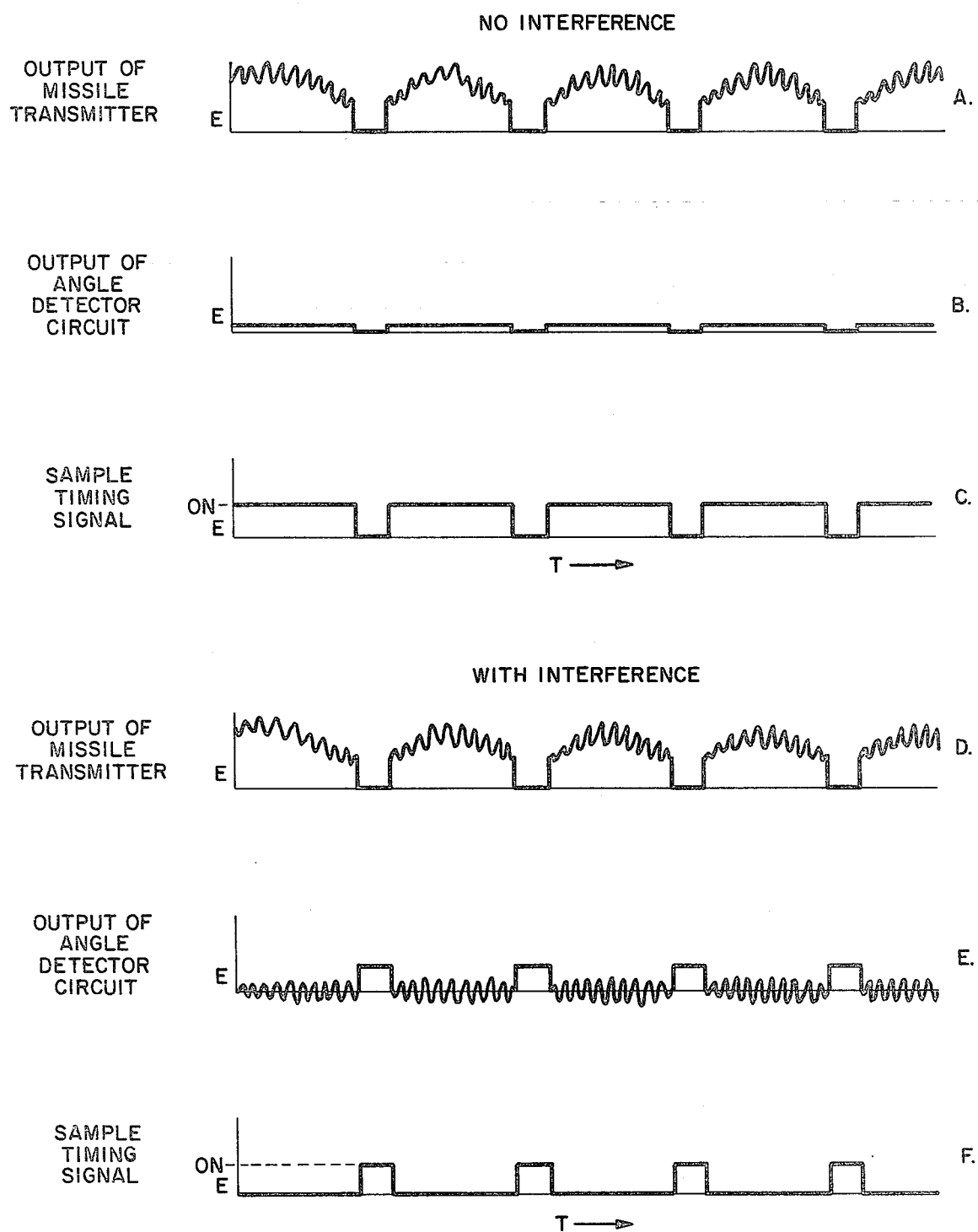
FIG. 2 is an arrangement of waveforms pertinent to the operation of this invention, with the waveforms of lines A through C representing operation in the absence of interference, and waveforms D through F representing operation in the presence of interference.

The output from the angle detector circuit 26 when our angle tracker is being used in the noninterference mode is depicted on line B of FIG. 2 as being of low amplitude, for in operation in the absence of an interfering source, there will normally be only a small pointing error.

In accordance with known art, our sum and difference monopulse receiving system utilizes an Automatic Gain Control 42 that enables the angle detector circuit output voltage to be independent of the incoming signal strength, by providing appropriate outputs, in the form of gain settings, to the Sum and Difference amplifiers 22 and 24. The AGC 42 receives on lead 43, the output from the Sum IF Amplifier 22, from which it derives the gain settings.

The output from the angle detector circuit 26, representing an error signal proportional to the pointing error of the antenna means, is coupled by means of a lead 46 to the Sample and Hold device 28. Also provided to the Sample and Hold is a Sample Timing Signal, provided on lead 40 from the Data Channel 36, with latter signal serving to gate the error signal output from the Angle Detector Circuit 26 in accordance with the mode in which our device is operating. The Sample Timing Signal is also provided as an input to the AGC 42, by means of lead 44.

Returning briefly to FIG. 2, it will be noted from line C that the Sample Timing Signal is a waveform at a level representing an "on" condition for the Sample and Hold circuit 28 during the transmission of the TV picture data. Also to be noted is the coincidence of the sample timing waveforms with the waveforms of line B, representing the output of the angle detector means 26.

The output of the Sample and Hold 28 is fed to a Null Positioning Means 30, latter being arranged to be able to redirect the polar pattern amplitude characteristic of the antenna means such that angle tracking from the desired signal source is accomplished, at which time the angle error signal from the angle detector means 26 will of course be minimized.

The null positioning means 30 may be a servo, in which instance the antenna means may be regarded as being redirected electromechanically. However, we are not to be limited to such an arrangement, and as a matter of fact, we can use a body fixed antenna means utilizing an electronic beam steering technique, if such be desired. For example, electronic phase shifters may be employed for rotating the antenna characteristics, in order to achieve the desired angle tracking.

If it should be desirable to accomplish angle tracking in two orthogonal planes, an additional hybrid network (not shown) will be necessitated so that a sum channel output and a difference channel output can be produced for each of the two orthogonal planes. Likewise, there will be a duplication of the mixer 18, the difference IF amplifier 24, the angle detector circuit 26, the sample and hold 28, and the null positioning means 30, inasmuch as it is desirable to rotate the antenna means to a null in each of the orthogonal planes, and these components are necessary in order that such orthogonal motion can be brought about.

On the other hand, there is typically no need for a second sum channel mixer and sum IF amplifier inasmuch as the output from such components shown in FIG. 1 is applicable to both angle detector circuits. Likewise, it is unnecessary for the automatic gain control 42 to be duplicated for use with a two orthogonal plane arrangement.

It will be understood that the output of the angle detector means 26 would be distorted if cofrequency signals were being received from two different angles at the same time. We have provided in accordance with this invention, therefore, an arrangement such that the output of the angle detector circuit 26 is sampled only at certain times. Sampling is normally arranged by having the Sample Timing Signal, carried by lead 40, arrive at the sample and hold device 28 in such a time relationship that the signal on lead 46 from the angle detector circuit is only passed at such time as the missile transmitter is providing an output.

In the presence of a jammer or other interference, although the output of the missile transmitter is, as depicted on line D of FIG. 2, the same as before, there will now be a very different output from the angle detector circuit 26; see line E of FIG. 2. Whereas as shown in line B of FIG. 2, there was no output from the angle detector at times when the missile transmitter was turned off, in the presence of interference, there will now be pulses somewhat resembling a square wave, as shown in line E, with the amplitude of these pulses representing the pointing error to the interference. The random waveforms shown between the well-defined pulses of Line E represent noise caused by the combination of the missile signal and the interference, which are simultaneously present.

In accordance with this invention we can effectively utilize the output pulses from the angle detector circuit 26 representing pointing error to the interference, by providing a switch 34 that enables a switching over from the sum pattern to the difference pattern. As will be noted from the sketch of these patterns revealed in FIGS. 1 and 4, the difference pattern is of double lobe configuration, with a very sharp, distinct null region midway between the two lobes. Thus, by causing the null positioning means 30 to function so as to direct the null of the difference pattern at the jamming or other interference source, we put the jammer at a very low gain portion of the pattern, rendering it relatively ineffective. The missile or other vehicle being guided being at any other location than the jammer, it will necessarily be on a higher amplitude portion of the difference pattern than the null, with the result being that a very favorable signal-to-unwanted-signal ratio is achieved.

As will be noted, the switch 34 receives outputs from the sum IF amplifier 22 as well as the difference amplifier 24, with the output selected by the switch thereafter going to the data channel 36. The data signal emanating from the data channel 36 is typically directed to a cockpit display 38, which of course may be a cathode ray tube. Upon the pilot noting the presence of a jamming signal, or some automatic circuit sensing the presence of a jamming signal, switch 34 is operated so as to cause the difference pattern output from difference amplifier 24 to be processed to generate the signal supplied over lead 40 as the sample timing signal, the latter being shown on line F of FIG. 2. The output of the angle detector circuit is illustrated on line E of FIG. 2, as previously mentioned.

As will now be seen, the sample timing signal representing the jammer signal will cause the gating of the jammer only signal through the sample and hold circuit of data representing the location of the jammer, which information will of course cause the null positioning means 30 to turn the antenna means 12 toward the interference source. Since the antenna array is now providing, as described above, a difference pattern, the operation of the means 30 will be such as to cause the center of the difference pattern to be directed toward the interference source, which is of course the null portion of the pattern. In this manner, the device in accordance with this invention can continue to accurately direct the vehicle to the destination, despite the presence of an otherwise effective jammer signal.

FIG. 3 illustrates the antenna pattern gain discrimination between an interfering signal source and the desired signal source. Both the sum channel discrimination and the difference channel discrimination curves are portrayed. From FIG. 3 it is seen that if the desired signal source were about seven degrees separated from the interfering signal source and the sum pattern maximum is being directed toward the desired signal, the sum pattern would provide about 2 dB (1.6:1) of discrimination, since the desired signal would experience a slightly higher antenna gain than the interfering signal. However, under the same angular conditions and the use of this invention, the difference or Δ channel as shown in this figure provides 20 dB (100:1) of antenna gain discrimination, thereby suppressing the interfering signal below the desired signal in a very effective way.

The data for FIG. 3 was extracted from the sum and difference antenna patterns well known in the state of the art, such as those depicted in FIG. 4.

It should now be apparent that we have provided a most effective null pattern angle tracking technique, using an accepted monopulse tracking arrangement in a novel mode, such that the signal-to-interference-signal ratio can be considerably increased, without necessitating a physically large antenna. Our invention may be utilized in a single plane, or if desired, our invention may be utilized for angle tracking in two orthogonal planes. Desired information may be recovered from both of the orthogonal planes in the presence of cofrequency interference, or from only one plane, depending on application and other factors.

We claim:

1. A null pattern technique for reduction of an undesired interfering signal in a data link channel, comprising antenna means operative in the electromagnetic domain to accomplish angle tracking, and having the capability of producing a sharp angle null in its polar pattern amplitude characteristic, detector means for recovering information from a desired signal source at a remote location, which source is substantially continuously interrupted, means utilizing the information obtained from said desired signal source for directing said antenna means with respect to said source, such that desired information continues to be obtained, said detector means also being capable of receiving information from an undesired source, means enabling the signals from the desired source to be disregarded insofar as redirecting of the antenna means is concerned, when in the presence of a cofrequency interfering signal from the undesired source, means for utilizing the interfering signal during interruptions from the desired signal source, for redirecting the polar pattern amplitude characteristic of the antenna such that the null of the antenna array is directed toward the undesired signal source, thus considerably increasing the signal-to-interfering-signal ratio.

2. The null pattern technique as defined in claim 1 in which a single lobe antenna pattern is utilized for recovering information when tracking the desired signal source, and a multilobe antenna pattern is utilized for recovering information when tracking the undesired source.

3. The null pattern technique as defined in claim 1 in which said means for redirecting the antenna characteristic is an electromechanical arrangement.

4. The null pattern technique as defined in claim 1 in which said means for redirecting the antenna characteristic is an electronic means.

5. The null pattern technique as defined in claim 1 in which angle tracking is simultaneously accomplished in two orthogonal planes.

6. The null pattern technique as defined in claim 5 in which desired information is recovered from each of the two orthogonal planes in the presence of cofrequency interference.

7. The null pattern technique as defined in claim 5 in which desired information is recovered from only one of the two orthogonal planes in the presence of cofrequency interference.

8. A null pattern angle tracking technique for reducing the effect of an undesirable cofrequency interfering signal in a data link channel comprising at least one antenna operative in the electromagnetic domain and having the capability of producing at least one sharp angular null as measured in its polar pattern amplitude characteristic, detector means for recovering desired information from a remote data channel transmitter that is substantially continuously interrupted, as well as making apparent the existence of an unwanted signal, means for redirecting the polar pattern amplitude characteristic of said antenna means such that angle tracking from the desired source is accomplished, means enabling any unwanted signal present to be utilized during such interruptions of the desired signal for redirecting the antenna by the unwanted signal source rather than by the desired source, such that the polar pattern null of the antenna is pointed in the direction of the unwanted signal, thus suppressing the unwanted signal and allowing the desired source to be utilized with a considerably improved signal-to-unwanted-signal ratio.

9. The null pattern technique as defined in claim 8 in which a single lobe antenna pattern is utilized for recovering information when tracking the desired signal source, and a multilobe antenna pattern is utilized when recovering information from the undesired source.

10. The null pattern technique as defined in claim 8 in which said means for redirecting the antenna characteristics is an electromechanical arrangement.

11. The null pattern technique as defined in claim 8 in which said means for redirecting the antenna characteristics is an electronic means.

12. The null pattern technique as defined in claim 8 in which angle tracking is accomplished in two orthogonal planes.

13. The null pattern technique as defined in claim 12 in which desired information is recovered from each of the two orthogonal planes in the presence of cofrequency interference.

14. The null pattern technique as defined in claim 12 in which desired information is recovered from only one of the two orthogonal planes in the presence of cofrequency interference.

15. A null pattern technique for reducing the effect of an undesirable interfering signal in a data link channel comprising antenna means operative in the electromagnetic domain, said antenna means having the capability of producing a rather sharply configured sum pattern, as well as a difference pattern having a null at approximately its center, means for processing the output from said antenna means, angle detector means for ascertaining any error existing between the pointing direction of the antenna pattern and a recurringly interrupted signal source, means for generating a sample timing signal, antenna pattern directing means arranged to receive the output from said angle detector means as well as receiving said sample timing signal, with the sample timing signal being responsible for gating the angle detector output to antenna pattern directing means, latter means being responsible for directing the antenna pattern at the signal source, and means operative during the presence of an interfering signal for changing the portion of the sample timing signal that is utilized, such that an angle detector output responsive to the interfering signal is utilized during interruption of the desired signal for directing the difference pattern toward the source of the interfering signal, with the result that the interfering source is received at a very low gain portion of the antenna pattern, thus considerably improving the signal-to-interfering-signal ratio.

16. The null pattern technique as defined in claim 15 in which a single lobe antenna pattern is utilized for recovering information when tracking the desired signal source, and a multilobe antenna pattern is utilized for recovering information when tracking the undesired source.

17. The null pattern technique as defined in claim 15 in which said means for redirecting the antenna characteristic is an electromechanical arrangement.

18. The null pattern technique as defined in claim 15 in which said means for redirecting the antenna characteristic is an electronic means.

19. The null pattern technique as defined in claim 15 in which angle tracking is simultaneously accomplished in two orthogonal planes.

20. The null pattern techniques as defined in claim 19 in which desired information is recovered from each of the two orthogonal planes in the presence of cofrequency interference.

21. The null pattern technique as defined in claim 19 in which desired information is recovered from only one of the two orthogonal planes in the presence of cofrequency interference.

22. The method of operating an antenna arrangement so as to minimize the effect of an undesired interfering signal in a data link channel being utilized for directing a vehicle containing a continuously interrupted source to a destination, comprising the steps of operating the antenna arrangement in a normal mode so as to create an antenna pattern having single and multiple lobes, with the multilobe pattern having a null at its center, extracting information from the vehicle by the use of said single lobe, processing the antenna multilobe output when in the presence of an interfering signal, and directng the null of such multilobe antenna pattern toward the source of such interfering signal during interruption of the source contained in the vehicle, thus causing the desired source to be received at a higher signal level than the interfering source.

* * * * *